United States Patent
Syamoto

(10) Patent No.: US 6,661,114 B2
(45) Date of Patent: Dec. 9, 2003

(54) SHIFT APPARATUS FOR VEHICLES

(75) Inventor: Noriyasu Syamoto, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 240 days.

(21) Appl. No.: 09/867,280

(22) Filed: May 29, 2001

(65) Prior Publication Data
US 2002/0014396 A1 Feb. 7, 2002

(30) Foreign Application Priority Data
May 31, 2000 (JP) .................................... 2000-161707

(51) Int. Cl.$^7$ ............................................. F16H 59/12
(52) U.S. Cl. ................... 307/10.1; 200/61.91; 74/473.3
(58) Field of Search .......................... 307/10.1; 477/99; 464/57; 70/252; 200/43.03, 61.91, 61.88; 74/473.3, 483 PB, 473.12

(56) References Cited

U.S. PATENT DOCUMENTS

| | | | |
|---|---|---|---|
| 3,901,097 A | * 8/1975 | Williams et al. ............ 74/473.3 |
| 4,583,171 A | 4/1986 | Hara et al. |
| 4,884,057 A | 11/1989 | Leorat |
| 5,065,135 A | * 11/1991 | Leigh-Monstevens et al. ............................ 477/99 |
| 5,085,106 A | * 2/1992 | Bubnash ....................... 74/335 |
| 5,156,243 A | * 10/1992 | Aoki et al. ............... 74/473.31 |
| 5,161,422 A | * 11/1992 | Suman et al. .............. 307/10.1 |
| 5,528,953 A | 6/1996 | Steinle et al. |
| 5,884,528 A | 3/1999 | Ludanek et al. |
| 5,957,001 A | * 9/1999 | Gualtieri et al. .......... 74/473.12 |
| 5,977,655 A | * 11/1999 | Anzai ......................... 307/10.3 |
| 6,233,986 B1 | * 5/2001 | Suzuki et al. .................. 70/252 |
| 6,246,127 B1 | * 6/2001 | Weilbacher et al. ........ 301/10.1 |
| 6,295,887 B1 | 10/2001 | DeJonge et al. |
| 6,500,092 B2 | * 12/2002 | Syamoto ....................... 477/99 |
| 2002/0011128 A1 | * 1/2002 | Syamoto et al. ........... 74/473.3 |
| 2002/0152827 A1 | * 10/2002 | Hayashi et al. ............. 74/473.3 |
| 2002/0170800 A1 | * 11/2002 | Nagasaka et al. ......... 192/219.6 |

FOREIGN PATENT DOCUMENTS

| | | | |
|---|---|---|---|
| CA | 1 212 557 A | 10/1986 | |
| DE | 197 47 269 A1 | 4/1999 | |
| EP | 0 121 167 A1 | 10/1984 | |
| GB | 2 310 693 A | 9/1997 | |
| GB | 2362930 A | * 12/2001 | ........... F16H/59/12 |
| JP | 4-232145 | 8/1992 | |
| JP | 4-254222 A | 9/1992 | |

* cited by examiner

Primary Examiner—Brian Sircus
Assistant Examiner—Roberto J. Rios
(74) Attorney, Agent, or Firm—Crompton, Seager & Tufte, LLC

(57) ABSTRACT

A shift apparatus for shifting gears in a vehicle driven by an engine. The shift apparatus includes a plurality of shift selectors that are pushed. The shift selectors instruct the shifting of gears. A rotatable engine start actuator is arranged at substantially the same location as the shift selectors to start the engine when rotated. A confirmation device confirms that the person operating the shift apparatus is an authorized user. A first enabling device enables the rotation of the engine start actuator based on the confirmation result of the confirmation device.

14 Claims, 8 Drawing Sheets

SHIFT APPARATUS FOR VEHICLES

BACKGROUND OF THE INVENTION

The present invention relates to a transmission gear shift apparatus for vehicles.

A conventional automatic transmission shifts gears by connecting and releasing gearsets with a clutch based on the vehicle speed or throttle opening. Further, a manual shift valve is actuated when a parking position or reverse gear is selected. The manual shift valve is also actuated when restricting forward gears to a predetermined low speed gear.

The manual shift valve is switched by a lever installed near the driver's seat. In a shift-by-wire automatic transmission, an actuator, which is operated by switches, shifts the manual shift valve. In this structure, an electric circuit connects the switch and the actuator. It is desirable that the electric circuit be used more effectively to make such a shift apparatus more compact, for example, by connecting an ignition switch, which starts the engine, to the electric circuit or by concentrating various switches and lever operation transmission mechanisms within a small area.

SUMMARY OF THE INVENTION

It is an object of the present invention to provide a compact transmission shift apparatus for vehicles.

To achieve the above object, the present invention provides a shift apparatus for shifting gears in a vehicle driven by an engine. The shift apparatus includes a plurality of shift selectors that are pushed. The shift selectors instruct the shifting of gears. A rotatable engine start actuator is arranged at substantially the same location as the shift selectors to instruct the starting of the engine when rotated. A confirmation device confirms that the person operating the shift apparatus is the proper user. A first enabling device enables the rotation of the engine start actuator based on the confirmation result of the confirmation device. A first detecting device detects whether the engine start actuator is rotated. An engine control unit drives the engine based on the detection result of the first detecting device.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
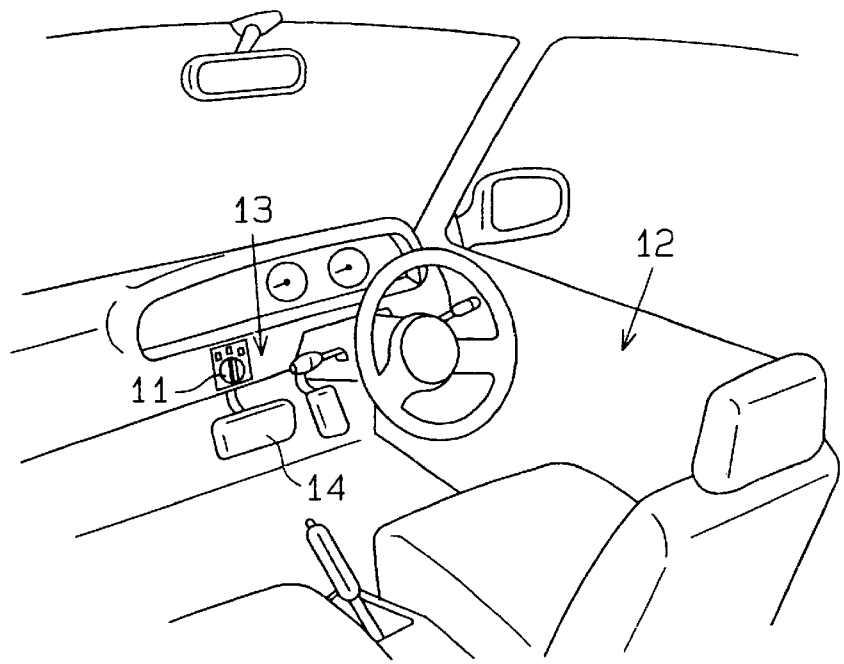
FIG. 1 is a diagram showing a driver's seat of an automatic transmission vehicle according to a first embodiment of the present invention.

A preferred embodiment according to the present invention will now be discussed with reference to FIGS. 1 to 14. A shift apparatus 11 is located on an instrument panel 13 in front and toward the left of a driver's seat 12, as viewed in FIG. 1. A brake pedal 14 is located in front of the driver's seat 12 at a low position.

Figure 2:
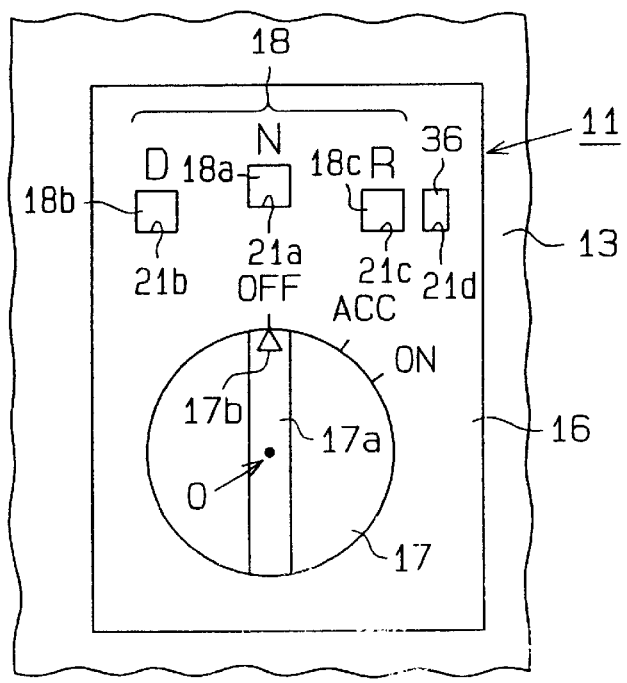
FIG. 2 is a schematic front view showing a shift apparatus.
Figure 3:
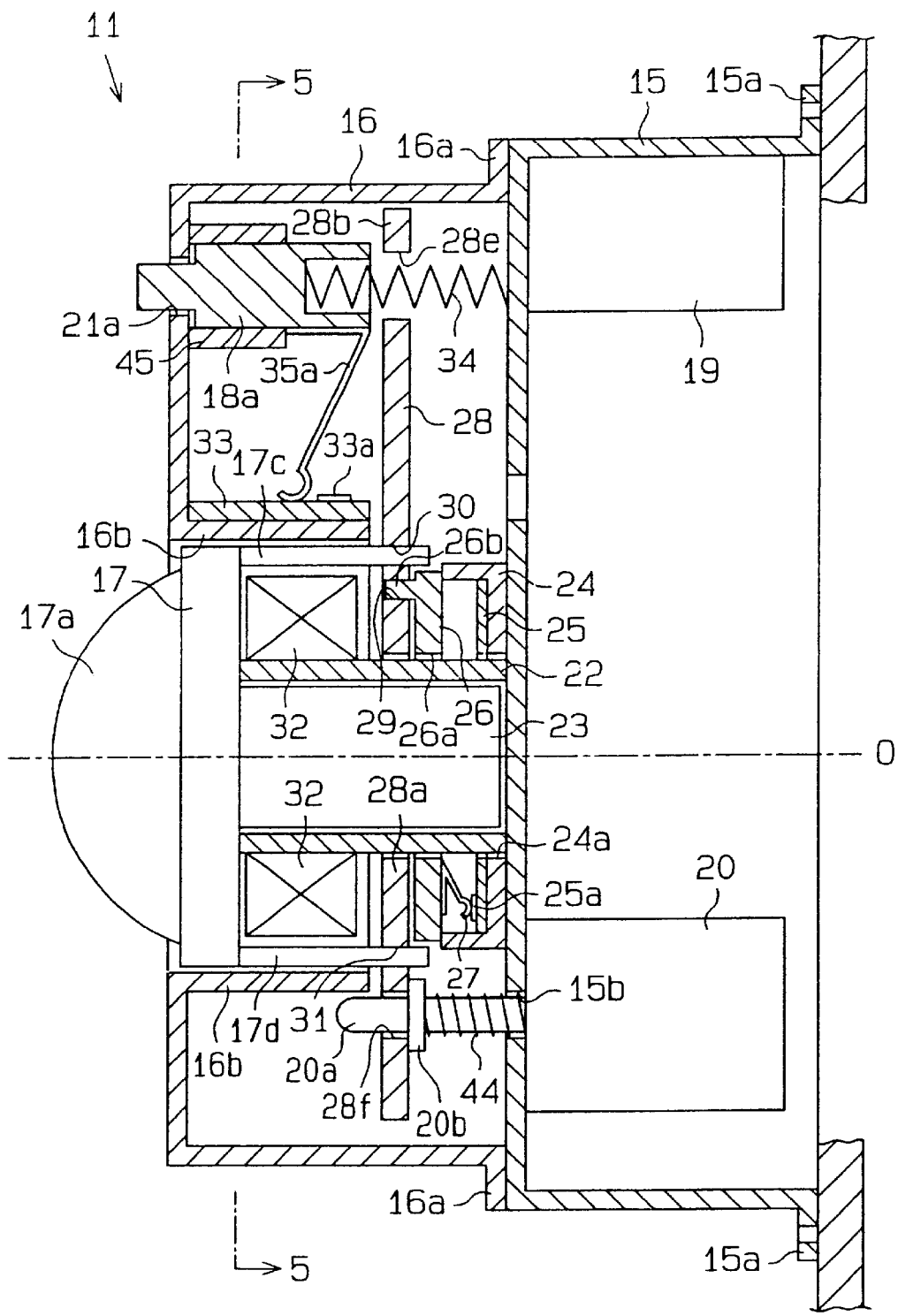
FIG. 3 is a cross-sectional side view showing the shift apparatus.

With reference to FIG. 3, the left side of the drawing is referred to as the front side, the right side of the drawing is referred to as the rear side, the far side of the apparatus 11 in a direction perpendicular to the plane of the drawing is referred to as the right side, and the near side of the apparatus 11 in a direction perpendicular to the plane of the drawing is referred to as the left side. As shown in FIGS. 2 and 3, a unit that includes a support base 15, a fixed base 16, a knob 17, and push-button switches 18a, 18b, 18c forms the shift apparatus 11. The knob 17 functions as an engine start actuator, and the push-button switches 18a, 18b, 18c function as shift selectors.

The support base 15 is cylindrical and has a front end closed by a plate. A flange 15a, which extends radially outward from the rear end of the support base 15, is fixed to a member (not shown) in the instrument panel 13. A controller 19, which is a shift ECU, is fixed to the rear side of the end plate in the support base 15. A solenoid 20, which is electrically connected to the controller 19, is fixed to the rear side of the end plate in the support base 15 below the controller 19. The solenoid 20 has a plunger 20a, which extends through a hole 15b formed in the end plate of the support base 15.

The plunger 20a moves between a lock position and an unlock position. The plunger 20a is extended from the solenoid 20 at the lock position and retracted in the solenoid 20 in the unlock position. Further, the plunger 20a is received in an elongated hole 28f or an elongated hole 28g, which will be described later, when located at the lock position. Contact between the distal end of the plunger 20a and the ends of the elongated hole 28f or the elongated hole 28g restricts the rotational range of a rotor plate 28, which will be described later. The plunger 20a is moved out of the elongated holes 28f, 28g when located at the unlock position. Accordingly, the plunger 20a serves as a first enabling device.

A flange 20b is provided at the front portion of the plunger 20a. A spring 44 is arranged on the plunger 19a between the flange 20b and the end plate of the support base 15 to urge the plunger 20a toward the lock position. Thus, the plunger 20a is normally located at the lock position.

The fixed base 16 is secured to the end plate of the support base 15. The fixed base 16 is cylindrical and has a front end closed by a plate. A flange 16a, which extends radially outward from the rear end of the fixed base 16, is fixed to the peripheral portion of the end plate of the support base 15. A cylindrical knob holder 16b projects rearward from a lower portion of the end plate of the fixed base 16.

A square first opening 21a is formed in the fixed base 16 above the axis 0 of the knob holder 16b, as viewed in FIG. 2. A second opening 21b and a third opening 21c, which are identical to the first opening 21a, are formed in the end plate of the fixed base 16. The second and third openings 21b, 21c are located slightly below each side of the first opening 21a. The openings 21a–21c are arranged along an imaginary circle, the center of which is the axis 0. A fourth opening 21d is formed near the right side of the third opening 21c. The width of the fourth opening 21d is about one half the width of the third opening 21c.

Referring to FIG. 3, a cylindrical fixed shaft 22, which is concentric with the knob holder 16b, is fixed to the front side of the end plate of the support base 15. A fixed base 24 is also fixed to the front side of the support base 15. The fixed base 24 has a hole 24a, the center of which is the axis 0. The fixed shaft 22 projects forward from the hole 24a.

Figure 4:
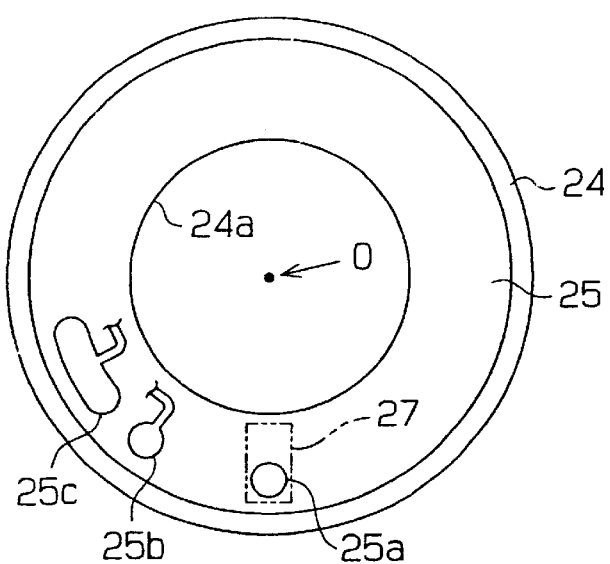
FIG. 4 is a front view showing a fixed base.

As shown in FIG. 3, a circuit board 25 is fixed to the end surface in the fixed base 24. With reference to FIG. 4, first, second, and third fixed electrodes 25a, 25b, 25c are arranged on the circuit board 25 along an imaginary circle, the center of which is the axis 0. The first fixed electrode 25a is arranged below the axis 0. The second and third electrodes 25b, 25c are sequentially arranged in the clockwise direction relative to the first fixed electrode 25a.

The space between the first fixed electrode 25a and the second fixed electrode 25b is greater than the space between the second fixed electrode 25b and the third fixed electrode 25c. The third fixed electrode 25b extends along the imaginary circle, the center of which is axis 0, and is longer than the second fixed electrode 25b. The first fixed electrode 25a functions as a dummy electrode and is not connected to electric wires. The second fixed electrode 25b functions as a fixed electrode for accessories, such as a car stereo or a navigation system. The third fixed electrode 25c functions as a fixed electrode for starting and driving the engine. The second and third fixed electrodes 25b, 25c are connected to the controller 19.

With reference to FIG. 3, a disk-like rotor body 26, which is made of an insulative material, is arranged in front of the fixed base 24. A hole 26a extends through the center of the rotor body 26. The fixed shaft 22 extends through the hole 26a. The rotor body 26 rotates relative to the fixed shaft 22 along the end surface of the fixed base 24. A connecting projection 26b projects forward from the rotor body 26 from a location above the axis 0.

Figure 7:
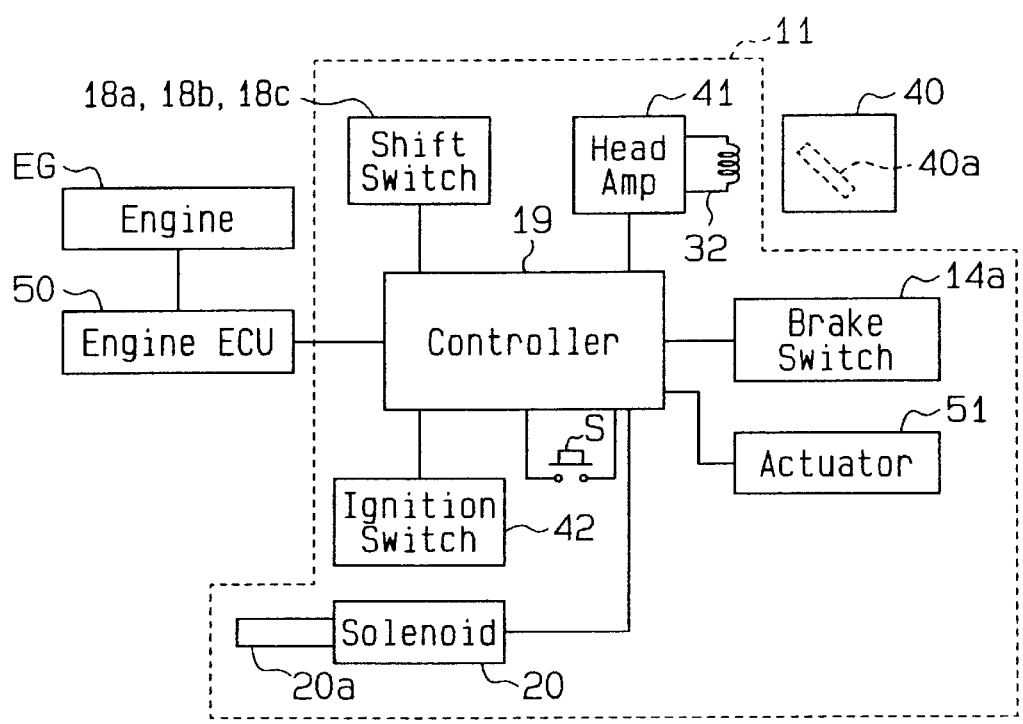
FIG. 7 is a block diagram showing the electric structure of the shift apparatus.

A movable electrode (contact) 27, which is made of a conductive metal, is fixed to rotor body 26 below the axis 0. The movable electrode 27 is connected to the controller 19 by a lead wire (not shown). The movable electrode 27 is elastic and constantly urged toward the front surface of the circuit board 25. Thus, as the rotor body 26 rotates, the movable electrode 27 selectively contacts the fixed electrodes 25a–25c. The movable electrode 27 and the second fixed electrode 25b form an accessory switch. The movable electrode 27 and the third fixed electrode 25c form an ignition switch 42, which serves as a first detecting device (FIG. 7).

The rotor plate 28 is arranged in front of the rotor body 26. A hole 28a extends through the center of the rotor plate 28. The fixed shaft 22 extends through the hole 28a. The rotor plate 28 is rotated relative to the fixed shaft 22. Further, the upper and lower ends of the rotor plate 28 are arcuate and extend about the axis 0, as viewed in FIG. 8. The left and right sides are linear and extend vertically, as viewed in FIG. 8.

An arcuate slit 28e, the center of which is the axis 0, extends from the upper left side of the rotor plate 28. The slit 28e defines a cantilever-like interference piece 28b at the upper end of the rotor plate 28. The distal end of the interference piece 28b is slightly extended from the left end of the rotor plate 28. The front surface of the rotor plate 28 is generally flat. Referring to FIG. 12, the distal portion of the interference piece 28b is bent rearward to define a guiding portion 28c. The distal end of the guiding portion 28c is bent forward to define an engaging portion 28d. The interference piece 28b, the guiding portion 28c, and the engaging portion 28d form a stopper 46, which is shown enclosed by the broken lines in FIGS. 8 to 11. The rotor plate 28 serves as a second enabling device.

Figure 8:
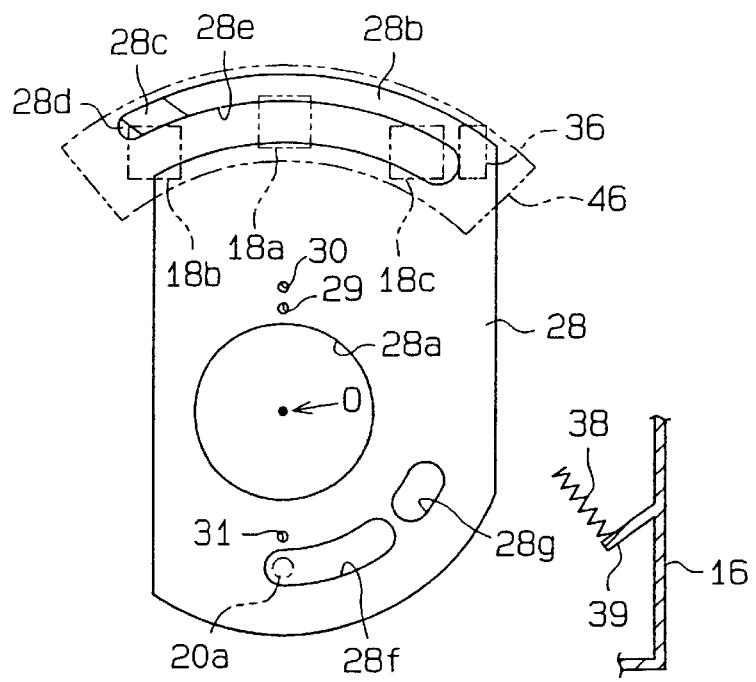
FIG. 8 is a schematic diagram showing a rotor plate located at an initial position.

As shown in FIGS. 3 and 8, the first elongated hole 28f is arcuate, the center of which is the axis 0, and formed in the rotor plate 28 at a location corresponding to the plunger 20a. The first elongated hole 28f extends counterclockwise from a point directly below the axis 0, as viewed in FIG. 8. A second elongated hole 28g is formed along a line extended in the counterclockwise direction from the first elongated hole 28f, or along the imaginary circle along which the first elongated hole 28f lies. The second elongated hole 28g is shorter than the first elongated hole 28f.

The connecting projection 26b of the rotor body 26 is received in a connecting hole 29 formed in the rotor plate 28. This connects and integrally rotates the rotor plate 28 and the rotor body 26. A pair of connecting holes 30, 31 are further formed in the rotor plate 28 on opposite sides of the axis 0.

As shown in FIG. 3, an antenna coil 32 is wound about the fixed shaft in front of the rotor plate 28. The antenna coil 32 is connected to the controller 19 via a head amplifier 41 (FIG. 7). The knob 17 is located in front of the antenna coil 32 and rotatably connected to the front end of the fixed shaft 22. A rotor shaft 23 projects from the rear central portion of the knob 17. The rotor shaft 23 is fit into the fixed shaft 22 to support the knob 17 relatively rotatable to the fixed shaft 22.

A grip 17a, which is used to rotate the knob 17, projects from the front side of the knob 17. A pointer 17b is provided above the grip 17a to indicate the operational position of the knob 17 (FIG. 2). Connecting projections 17c, 17d, which project from the rear side of the knob 17, are respectively fit into the connecting holes 30, 31 to rotate the knob 17 integrally with the rotor plate 28. Accordingly, the knob 17, the rotor shaft 23, the rotor plate 28, and the rotor body 26 are rotated integrally when the grip 17a is rotated. The rotation of the knob 17 connects the movable electrode (contact) 27 with the fixed electrode (contact) 25c.

Figure 5:
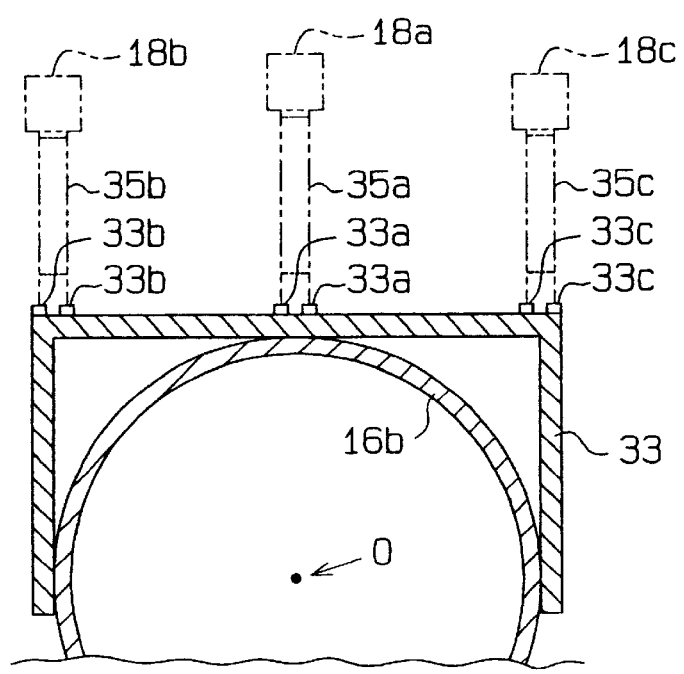
FIG. 5 is a cross-sectional view of a circuit board taken alone line 5—5 in FIG. 3.

With reference to FIG. 5, a circuit board 33, which has a cup-like cross-section, is fixed to the uppermost portion of the knob holder 16b. A first electrode 33a, a second electrode 33b, and a third electrode 33c are fixed to the upper surface of the circuit board 33. Each of the fixed electrodes 33a–33c are formed by a pair of electrode pieces and connected to the controller 19 by a lead wire (not shown).

With reference to FIGS. 3 and 12, a retainer 45 is provided for each of the openings 21a–21c. The retainers 45 extend rearward from the end plate of the fixed base 16. The retainers 45 retain the push-button switches 18a–18c. The front part of each push-button switch 18a–18c has a stepped portion. The stepped portion contacts the rear surface of the end plate of the fixed base 16. The front ends of the push-button switches 18a–18c are located in front of the openings 21a–21c. The push-button switches 18a–18c each have a rear end, which is opened and hollow. A compression spring 34 is arranged between the hollow end of each push-button switch 18a–18c and the front end of the support base 15. The springs 34 urge the push-button switches 18a–18c forward.

Movable electrodes 35a, 35b, 35c are respectively fixed to the lower surfaces of the push-button switches 18a, 18b, 18c. The movable electrodes 35a–35c extend downward from the associated push-button switches 18a–18c and are elastic. This constantly urges the movable electrodes 35a–35c toward the circuit board 33. When the push-button switches 18a–18c are pushed, the movable electrodes 35a–35c contact the associated fixed electrodes 33a–33c. The movable electrodes 35a–35c and the fixed electrodes 33a–33c function as a second detecting device for detecting the position of the associated push-button switches 18a, 18b, 18c.

Referring to FIG. 12, a release button 36 is received in the fourth opening 21d. A flange 36a is provided on the front end of the release button 36. The portion of the release button 36 in front of the flange 36a projects from the opening 21d. A user pushes the projecting portion.

An elbow-like support 16c extends from the fixed base 16. The support 16c has a hole 16d to receive the rear portion of the release button 36. A compression spring 37 is wound about the release button 36 between the flange 36a and the support 16c. The movement of the release button 36 produced by the spring 37 is restricted by the flange 36a. The rear end surface of the release button 36 is inclined in correspondence with the guiding portion 28c of the rotor plate 28 and functions as a pushing portion 36b.

Figure 9:
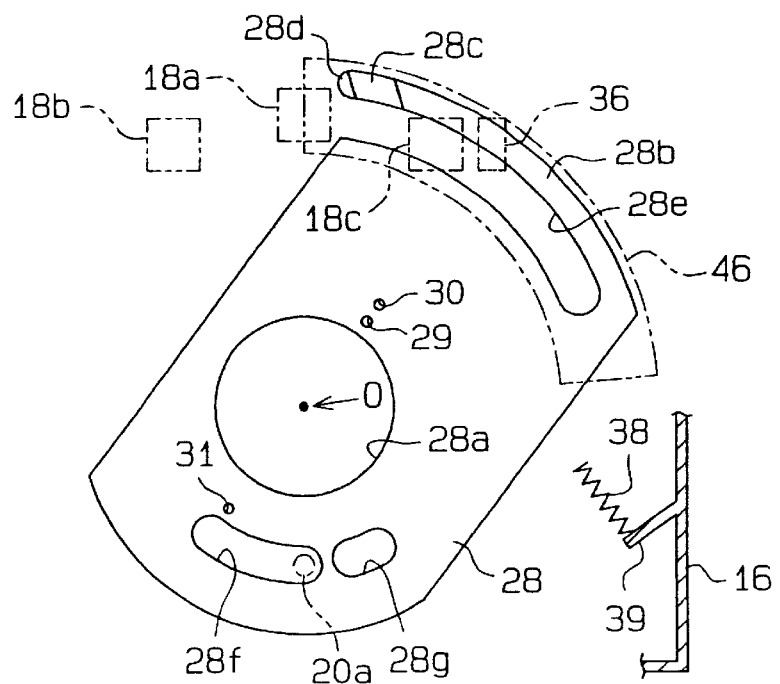
FIG. 9 is a schematic diagram showing the rotor plate located at a first unlock position.
Figure 10:
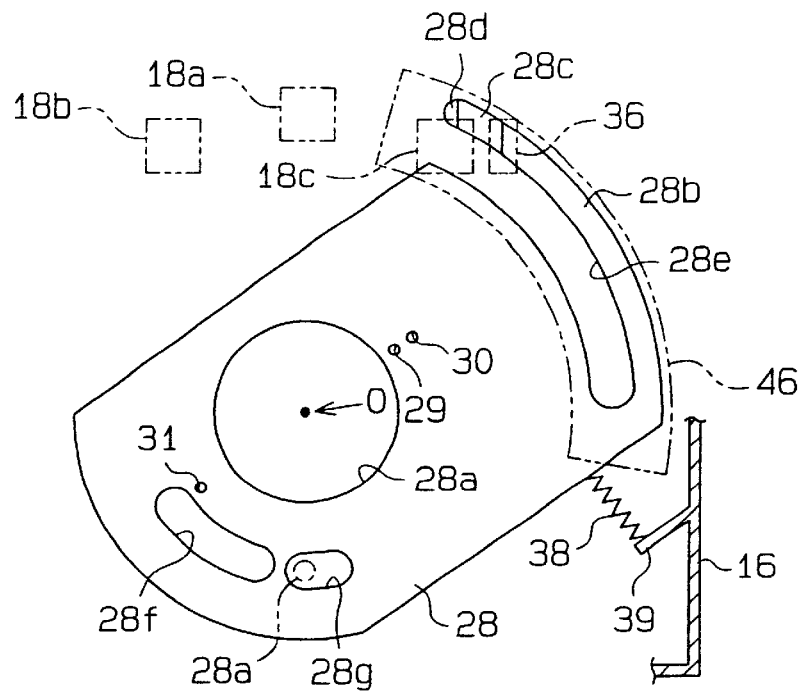
FIG. 10 is a schematic diagram showing the rotor plate located at an engine start position.

As shown in FIGS. 8 and 9, a support piece 39 extends from the side wall in the fixed base 16. The basal end of a return spring 38 is attached to the support piece 39. The distal end of the return spring 38 is located along a rotating path of the rotor plate 28. Referring to FIGS. 8 and 9, the rotor plate 28 does not contact the return spring 38 as long as the elongated hole 28f opposes the plunger 20a. As shown in FIG. 10, the rotor plate 28 contacts the return spring 38 when the elongated hole 28g opposes the plunger 20a. When the rotor plate 28 is further rotated from the position of FIG. 10 to the position of FIG. 11 and the plunger 20a relatively moves to the end of the second elongated hole 28g, the return spring 38 urges the rotor plate 28 in the counterclockwise direction.

With reference to FIG. 2, the characters OFF, ACC, and ON are marked on the front surface of the fixed base 16. The OFF mark indicates an engine off position, the ACC mark indicates an accessory position, and the ON mark indicates an engine ON position. The rotor plate 28 is rotated between the positions shown in FIGS. 8 and 11.

When the pointer 17b of the knob 17 is pointed to the OFF mark, the rotor plate 28 is located at an initial position, the state of which is shown in FIG. 8. In this state, the movable electrode 27 contacts the first fixed electrode 25a of the circuit board 25. Further, the push-button switches 18a–18c and the release button 36 oppose the stopper 46 and thus cannot be pushed. Additionally, the plunger 20a engages one end of the first elongated hole 28f.

When the pointer 17b of the knob 17 is pointed to the ACC mark, the rotor plate 28 is located at a first unlock position, the state of which is shown in FIG. 9. In this state, the movable electrode 27 is connected to the second fixed electrode 25b of the circuit board 25. Further, the first and second push-button switches 18a, 18b do not oppose the stopper 46 and thus can be pushed. However, the third push-button switch 18c and the release button 36 oppose the stopper 46 and thus cannot be pushed. The plunger 20a engages the other end of the first elongated hole 28f.

When the pointer 17b of the knob 17 is pointed to the ON mark, the rotor plate 28 is located at an engine start position, the state of which is shown in FIG. 10. In this state, the movable electrode 27 is connected to the third fixed electrode 25c of the circuit board 25. Further, the first and second push-button switches 18a, 18b do not oppose the stopper 46 and thus can be pushed. However, the third push-button switch 18c opposes the stopper 46 and thus cannot be pushed. The plunger 20a engages one end of the second elongated hole 28g.

Figure 11:
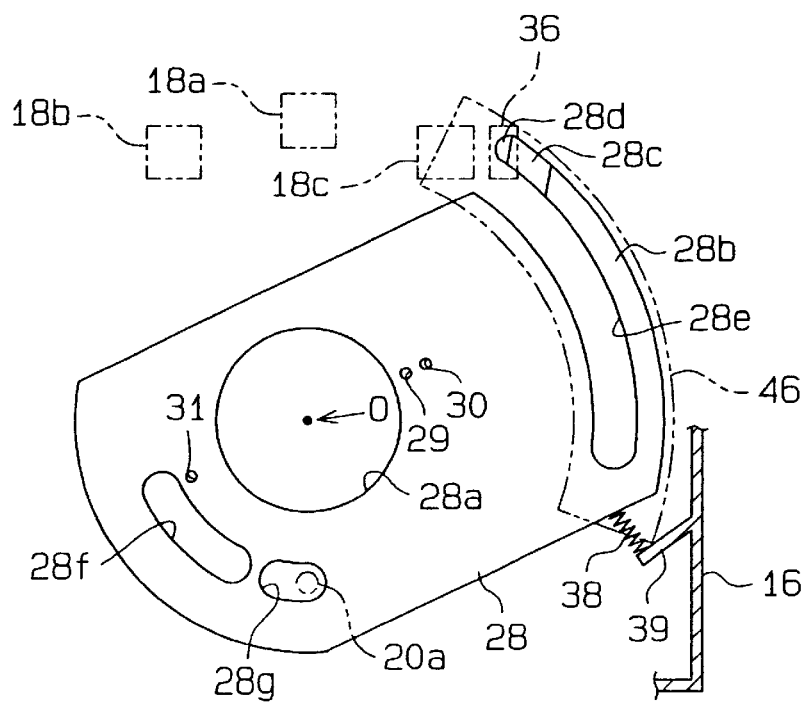
FIG. 11 is a schematic diagram showing the rotor plate located at a second unlock position.
Figure 12:
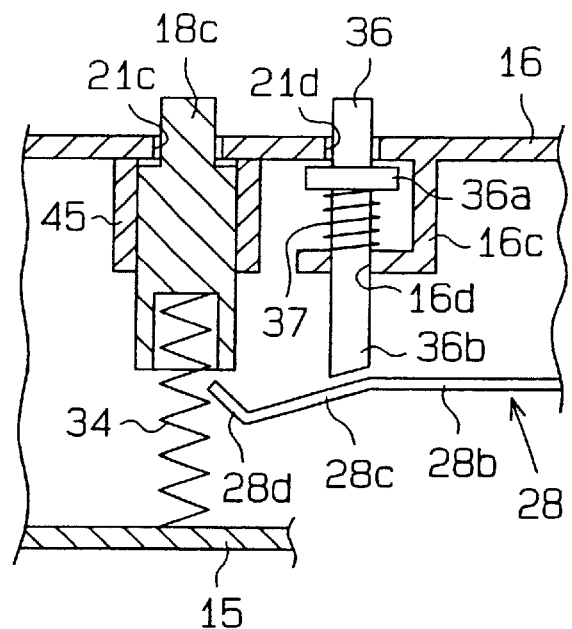
FIG. 12 is a schematic diagram showing the rotor plate of FIG. 10 from another view.

The state of FIG. 11 shows the rotor plate 28 located at a second unlock position. In this state, the movable electrode 27 is connected to the third fixed electrode 25c. Further, the push-button switches 18a–18c do not oppose the stopper 46 and thus can be pushed. The plunger 20a engages the other end of the second elongated hole 28g.

The electric structure of the shift apparatus 11 and peripheral devices will now be discussed.

Figure 6:
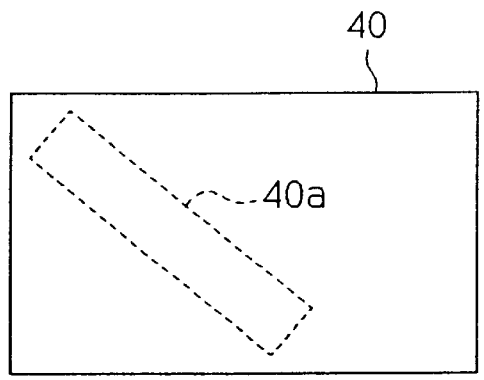
FIG. 6 is a front view showing a card key.

FIG. 6 shows a card key 40, which is provided separately from the shift apparatus 11. A transponder 40a, which stores an immobilizer identification code, is embedded in the card key 40. When the card key 40 is held near the antenna coil 32, the transponder 40a transmits the immobilizer identification code to the controller 19 via the antenna coil 32. A brake switch 14a (FIG. 7), which sends a brake detection signal to the controller 19 when the brake pedal 14 is depressed, is arranged in the vicinity of the brake pedal 14. The controller 19 of the shift apparatus 11 is electrically connected to an engine EG by an engine ECU 50.

A head amplifier 41 connects the controller 19 and the antenna coil 32 to each other. The head amplifier 41 amplifies a determination request signal, which is output from the controller 19 and sent to the antenna coil 32.

The controller 19 controls an actuator 51, which is a motor or the like, to switch a manual shift valve (not shown) functioning to shift gear ranges. The manual shift valve is a spool type valve like the conventional manual shift valve used in automatic transmissions to manually shift ranges. The spool type valve is supplied with oil to transmit hydraulic pressure to the clutch in correspondence with the driving range determined by the gearshift position.

The operation of the shift apparatus 11 of the preferred embodiment will now be discussed.

In an initial state of the shift apparatus 11, or when the engine EG is stopped, the pointer 17b of the knob 17 is pointed toward the OFF mark. The rotation of the knob 17 is restricted in this state. Further, the movable electrode 27 is connected to the first fixed electrode 25a. The first, second, and third push-button switches 18a–18c oppose the stopper 46 and the push-button switches 18a–18c thus cannot be pushed. The plunger 20a is located at the lock position.

In the preferred embodiment, the rotation of the knob 17 is restricted when the pointer 17b is pointed to a position between the OFF and ACC marks.

When the knob 17 is rotated to point the pointer 17b to the ACC mark, the movable electrode 27 is connected to the fixed electrode 25b. Thus, the controller 19 receives an accessory ON signal. The controller 19 performs the processes required to activate the accessories based on the accessory ON signal. Further, when the pointer 17b is pointed toward the ACC mark, the rotor plate 28 is moved from the lock position to the first unlock position, as shown in the state of FIG. 9. In this state, the stopper 46 is moved away from the first and second push-button switches 18a, 18b. Thus, the pushing of the push-button switches 18a, 18b is enabled.

Figure 14:
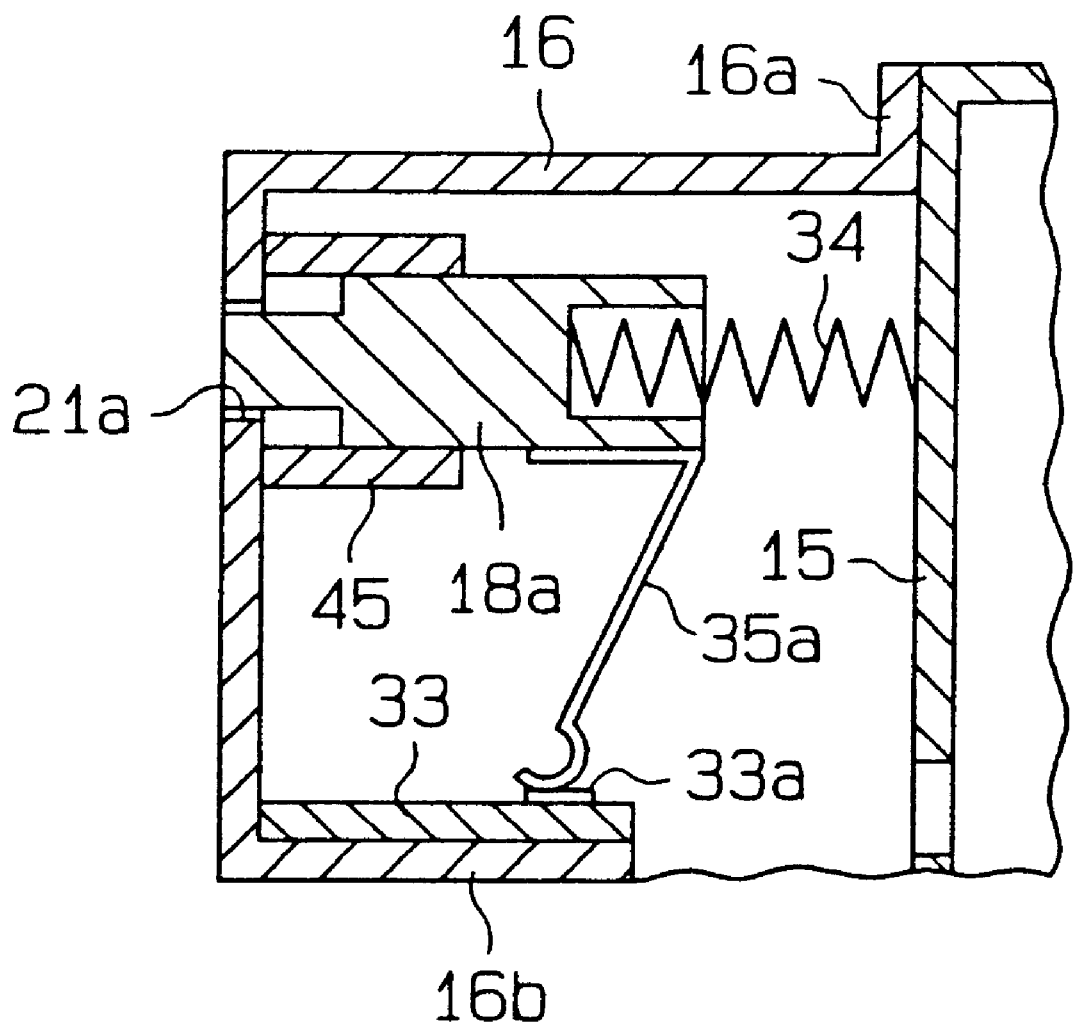
FIG. 14 is a schematic view showing a push-button switch.

When the first push-button switch 18a is pushed as shown in FIG. 14, the first movable electrode 35a is connected to the first fixed electrode 33a and the controller 19 receives a neutral position signal. The controller 19 controls the actuator 51 in correspondence with the neutral position based on the neutral position signal. When the second push-button switch 18b is pushed, the second movable electrode 35b is connected to the second fixed electrode 33b and the controller 19 receives a drive position signal. The controller 19 controls the actuator 51 in correspondence with the drive position based on the drive position signal.

When a power switch S, which is located on the instrument panel 13, is pushed, the controller 19 sends a determination request signal to the head amplifier 41. The head amplifier 41 amplifies the determination request signal and sends the amplified signal to the antenna coil 32. If the card key 40 is held near the shift apparatus 11 in this state, the antenna coil 32 transmits the determination request signal to the transponder 40a. When the transponder 40a receives the determination request signal, the transponder 40a transmits the immobilizer identification code to the head amplifier 41 via the antenna coil 32. The head amplifier 41 then sends the immobilizer identification code to the controller 19.

The controller 19 compares the immobilizer identification code with a prestored vehicle identification code. When the codes match, the controller 19 verifies the card key 40 and determines that the card key 40 is held by an authorized user. The controller 19, the antenna coil 32, and the head amplifier 41 form a confirmation device. In such case, the controller 19 stores key recognition information. When the brake pedal 14 is depressed in this state, the brake switch 14a sends a brake detection signal to the controller 19. The controller 19 sends an excitation signal to the solenoid 20 if the controller 19 stores the key recognition information and receives the brake detection signal. More specifically, when the engine EG is not running, the controller 19 unlocks the solenoid 20 when two conditions are both satisfied. The first condition is that the controller 19 receives the key recognition information, which indicates that the proper user is holding the card key 40, and the second condition is that the controller 19 receives the brake detection signal. Based on the excitation signal, the solenoid 20 moves the plunger 20a from the lock position to the unlock position. This results in the knob 17 entering a rotation enablement state (unlocked state) from the rotation restriction state (locked state).

When the knob 17 is in the rotation enablement state and the knob 17 is rotated so that the pointer 17b points the ON mark, the movable electrode 27 is connected to the third fixed electrode 25c. As a result, the controller 19 receives an engine start signal from the third fixed electrode 25c. Based on the engine start signal, the controller 19 sends an engine drive permission signal to the engine ECU 50. The engine ECU 50 starts the engine EG based on the engine drive permission signal.

When the brake pedal 14 is released after the engine ECU 50 starts the engine EG, the controller 19 de-excites the solenoid 20 based on a brake release signal sent from the brake switch 14a. Thus, the force of the spring 44 moves the plunger 20a of the solenoid 20 to the lock position.

When the pointer 17b of the knob 17 is pointed toward the ON mark, the stopper 46 opposes the push-button switch 18c. Thus, the stopper 46 continues to disable the pushing of the push-button switch 18c. If the push-button switch 18c is pushed, the push-button switch 18c abuts the engaging portion 28d of the rotor plate 28, as shown in FIG. 12. Thus, the push-button switch 18c cannot be pushed.

To push the push-button switch 18c, when the rotor plate 28 is in the state of FIG. 10, the release button 36 is pushed (FIG. 12). The pushing portion 36b of the release button 36 pushes the guiding portion 28c of the rotor plate 28. This rotates the rotor plate 28 about the axis 0 in the clockwise direction against the force of the return spring 38.

Figure 13:
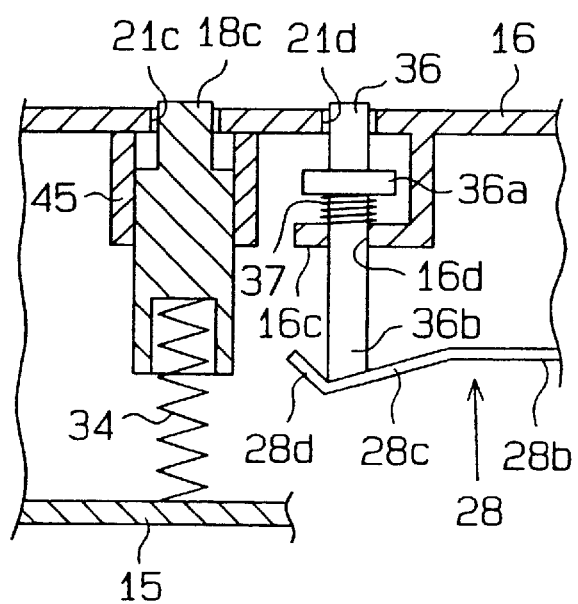
FIG. 13 is a schematic diagram showing the rotor plate of FIG. 11 from another view.

As a result, the rotor plate 28 is rotated to the second unlock position, which is shown in the state of FIGS. 11 and 13, and the stopper 46 is moved away from the push-button switch 18c. Thus, the pushing of the push-button switch 18c is enabled. When the third push-button switch 18c is pushed in this state, the third movable electrode 35c is connected to the fixed electrode 33c. Thus, the controller 19 receives a rear drive position signal and drives the actuator 71 based on the reverse drive position signal.

When the brake pedal 14 is released after the engine EG is started, the controller 19 controls the solenoid 20 based on a brake release signal sent from the brake switch 14a and moves the plunger 20a toward the unlock position. Accordingly, to move the plunger 20a to the unlock position when the engine EG is running, the card key 40 need not be verified again and the brake pedal 14 need only be depressed.

To stop the engine EG, the brake pedal 14 is depressed and the plunger 20a is moved to the unlock position. The knob 17 is then rotated to point the pointer 17b toward the OFF mark. When the movable electrode 27 is disconnected from the third fixed electrode 25c, the controller 19 receives an OFF signal. Based on the OFF signal, the controller 19 sends an engine stop signal to the engine ECU 50. The engine ECU 50 stops the engine EG based on the engine stop signal.

In the preferred embodiment, the push-button switches 18a–18c are located near the knob 17. Thus, in comparison to when the push-button switches 18a–18c and the knob 17 are separated from each other in different units, the shift apparatus 11 has fewer components, uses space more efficiently, and is more compact.

In the preferred embodiment, when the engine EG is stopped, a detector formed by the controller 19 and the antenna coil 32 verifies the card key 40 with the transponder 40a and determines that the card key 40 is held by the proper user. If the brake pedal 14 is depressed in this state, the controller 19 moves the plunger 20a from the lock position to the unlock position. This enables the rotation of the knob 17. When the rotation of the knob 17 is enabled, the rotation of the knob 17 to point the pointer 17b toward the ON mark and the pushing of the push-button switch 18 are enabled.

When the engine EG is stopped, the knob 17 remains in a rotation restriction state unless the controller 19 verifies the card key 40 and determines that the card key 40 is held by the proper user. In this state, not all of the push-button switches 18a–18c can be pushed. This prevents the vehicle from being stolen. Further, the plunger 20a of the solenoid 20 does not allow the knob 17 to start the engine EG unless the controller 19 verifies the card key 40 and determines that the card key 40 is held by the proper user. This also prevents the vehicle from being stolen.

In the preferred embodiment, the same solenoid 20 is used to enable and disable the pushing of the third push-button switch 18c and the rotation of the knob 17. This decreases costs in comparison to when solenoids are provided separately for the knob 17 and the push-button switch 18c.

In the preferred embodiment, the pushing of the push-button switches 18a–18c is enabled and disabled in accordance with the rotated position of the rotor plate 28. Accordingly, the push-button switches 18a–18c are locked and unlocked with a simple structure.

In the preferred embodiment, the push-button switch 18c cannot be pushed unless the release button 36 is pushed. Accordingly, the push-button switch 18c is prevented from being erroneously pushed when the vehicle is being driven forward.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

What is claimed is:

1. A shift apparatus for shifting gears in a vehicle driven by an engine, the shift apparatus comprising:
   a plurality of shift selectors that are pushed, wherein the shift selectors instruct the shifting of gears;
   a rotatable engine start actuator arranged at substantially the same location as the shift selectors to instruct the starting of the engine when rotated;
   a confirmation device for confirming that the person operating the shift apparatus is the proper user;
   a first enabling device for enabling the rotation of the engine start actuator based on the confirmation result of the confirmation device; and
   a second enabling device integrally movable with the engine start actuator between a lock position and an unlock position, wherein the pushing of the shift selectors is disabled and enabled in the lock position and the unlock position, respectively.

2. The shift apparatus according to claim 1, wherein the confirmation device includes a controller for recognizing the proper user when external data matches prestored data.

3. The shift apparatus according to claim 2, wherein the first enabling device includes a solenoid excited and de-excited by the controller, the solenoid having a plunger that interferes with and disables the rotation of the engine start actuator when the solenoid is de-excited and moves to a position enabling the rotation of the engine start actuator when the solenoid is excited.

4. The shift apparatus according to claim 1, wherein the second enabling device includes a rotor plate rotated integrally with the engine start actuator.

5. The shift apparatus according to claim 1, further comprising:
   a second detecting device for detecting the position of the shift selectors; and
   a controller for shifting gears based on the detection result of the second detecting device.

6. The shift apparatus according to claim 5, wherein the second detecting device includes:
   a plurality of movable electrodes respectively arranged in correspondence with the shift selectors, wherein the movable electrodes move integrally with the associated shift selectors;
   a plurality of fixed electrodes each arranged along a path of an associated one of the movable electrodes at a location to which the associated shift selector moves, wherein the fixed electrodes output different signals when connected to the associated movable electrodes, and the controller shifts gears based on the signals from the fixed electrodes.

7. A shift apparatus for shifting gears in a vehicle driven by an engine, the shift apparatus comprising:
   a plurality of shift selectors that are pushed, wherein the shift selectors instruct the shifting of gears;
   a rotatable engine start actuator arranged at substantially the same location as the shift selectors to instruct the starting of the engine when rotated;
   a confirmation device for confirming that the person operating the shift apparatus is the proper user;
   a first enabling device for enabling the rotation of the engine start actuator based on the confirmation result of the confirmation device;
   a first detecting device for detecting whether the engine start actuator is rotated;
   an engine control unit for driving the engine based on the detection result of the first detecting device; and
   a second enabling device integrally movable with the engine start actuator between a lock position and an unlock position, wherein the pushing of the shift selectors is disabled and enabled in the lock position and the unlock position, respectively.

8. The shift apparatus according to claim 7, wherein the first detecting device includes an ignition switch, and wherein the ignition switch includes a movable contact arranged in the engine start actuator and a fixed contact arranged on a member opposing the engine start actuator, the movable contact being moved and connected to the fixed contact when the engine start actuator is rotated.

9. The shift apparatus according to claim 7, wherein the confirmation device includes a controller for recognizing the proper user when external data matches prestored data.

10. The shift apparatus according to claim 7, wherein the first enabling device includes a solenoid excited and de-excited by the controller, the solenoid having a plunger that interferes with and disables the rotation of the engine start actuator when the solenoid is de-excited and moves to a position enabling the rotation of the engine start actuator when the solenoid is excited.

11. The shift apparatus according to claim 10, wherein the second enabling device includes a rotor plate rotated integrally with the engine start actuator.

12. The shift apparatus according to claim 7, further comprising:
   a second detecting device for detecting the position of the shift selectors; and
   a controller for shifting gears based on the detection result of the second detecting device.

13. The shift apparatus according to claim 12, wherein the second detecting device includes:
   a plurality of movable electrodes respectively arranged in correspondence with the shift selectors, wherein the movable electrodes move integrally with the associated shift selectors;
   a plurality of fixed electrodes each arranged along a path of an associated one of the movable electrodes at a location to which the associated shift selector moves, wherein the fixed electrodes output different signals when connected to the associated movable electrodes, and the controller shifts gears based on the signals from the fixed electrodes.

14. A shift apparatus for shifting gears in a vehicle driven by an engine, the shift apparatus comprising:

a plurality of shift selectors that are pushed, wherein the shift selectors instruct the shifting of gears;

a rotatable engine start actuator arranged at substantially the same location as the shift selectors to instruct the starting of the engine when rotated;

a confirmation device for confirming that the person operating the shift apparatus is the proper user; wherein the confirmation device includes a controller for recognizing the proper user when external data matches prestored data;

a first enabling device for enabling the rotation of the engine start actuator based on the confirmation result of the confirmation device, wherein the first enabling device includes a solenoid excited and de-excited by the controller, the solenoid having a plunger that interferes with and disables the rotation of the engine start actuator when the solenoid is de-excited and moves to a position enabling the rotation of the engine start actuator when the solenoid is excited; and a second enabling device including a rotor plate rotated integrally with the engine start actuator, wherein the rotation of the engine start actuator rotates the rotor plate between a lock position for disabling the pushing of the shift selectors and an unlock position for enabling the pushing of the shift selectors.

* * * * *